Dec. 8, 1931.   A. R. LIVELY   1,835,313
STREET INDICATING AND ADVERTISING DEVICE
Filed Sept. 22, 1930   3 Sheets-Sheet 1
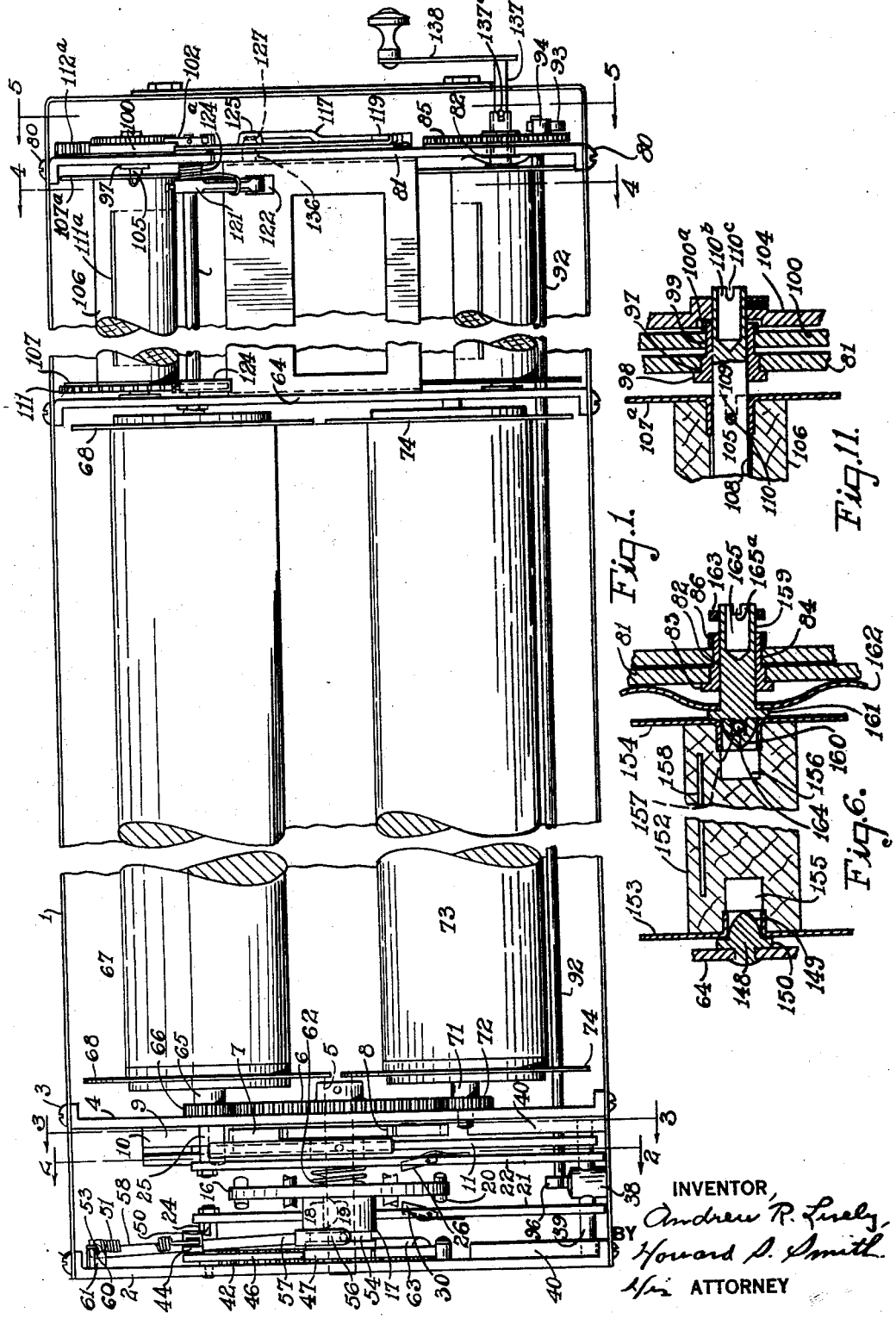

Dec. 8, 1931.  A. R. LIVELY  1,835,313

STREET INDICATING AND ADVERTISING DEVICE

Filed Sept. 22, 1930  3 Sheets-Sheet 2

INVENTOR
Andrew R. Lively
BY Howard S. Smith
ATTORNEY

Dec. 8, 1931. A. R. LIVELY 1,835,313
STREET INDICATING AND ADVERTISING DEVICE
Filed Sept. 22, 1930 3 Sheets-Sheet 3
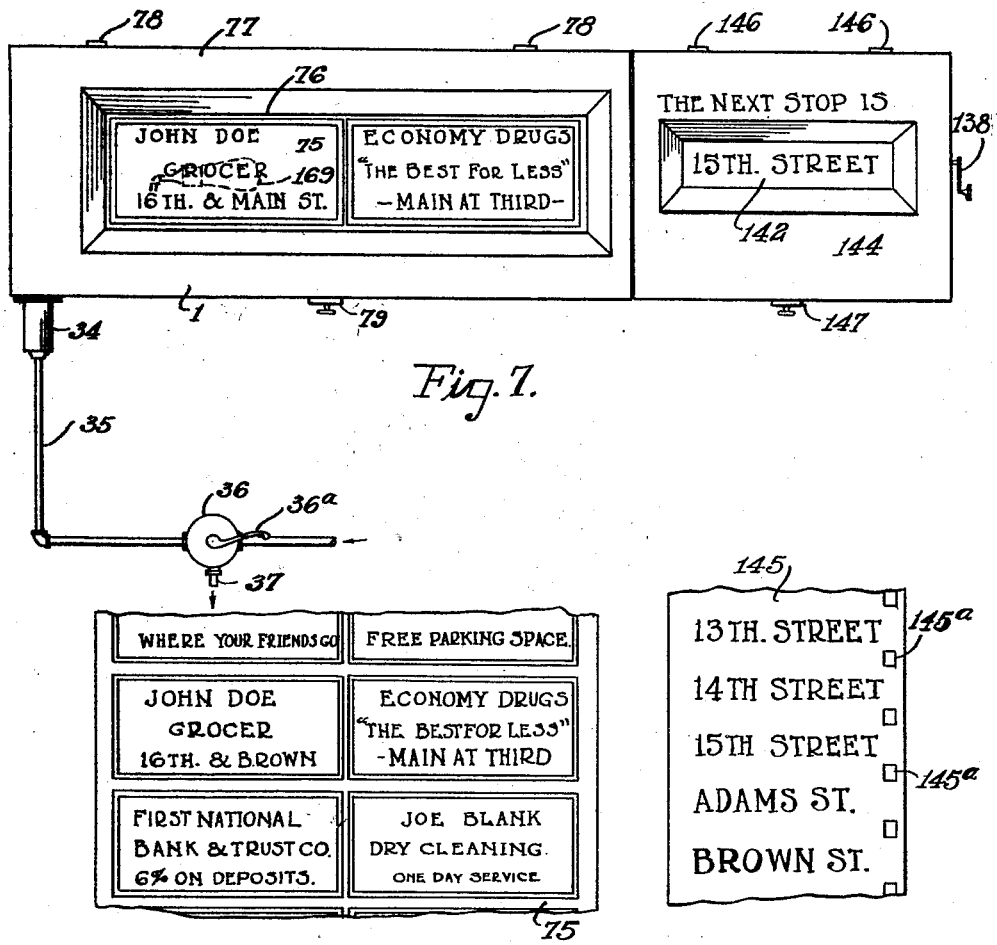

Patented Dec. 8, 1931

1,835,313

UNITED STATES PATENT OFFICE

ANDREW R. LIVELY, OF DAYTON, OHIO

STREET INDICATING AND ADVERTISING DEVICE

Application filed September 22, 1930. Serial No. 483,510.

This invention relates to new and useful improvements in street indicating and advertising devices.

It is one of the principal objects of my invention to provide a simple, economical and efficient device that may be placed in a street car or other vehicle to indicate visibly to the passengers thereof the street or station at which the next stop will be made.

It is an other object of my invention to provide automatically operated means for showing different advertisements to the passengers during the trip.

Other important and incidental objects will be brought out in the following specification and particularly set forth in the subjoined claims.

The device consists mainly of an advertising display indexing mechanism operated by the upward movement of a compressed air cylinder plunger and a directory indexing device operated by the return or downward movement of the plunger.

Figure 5:
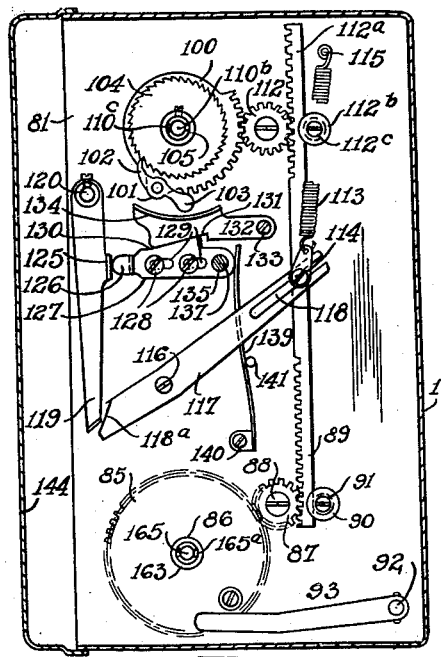
Figure 4:
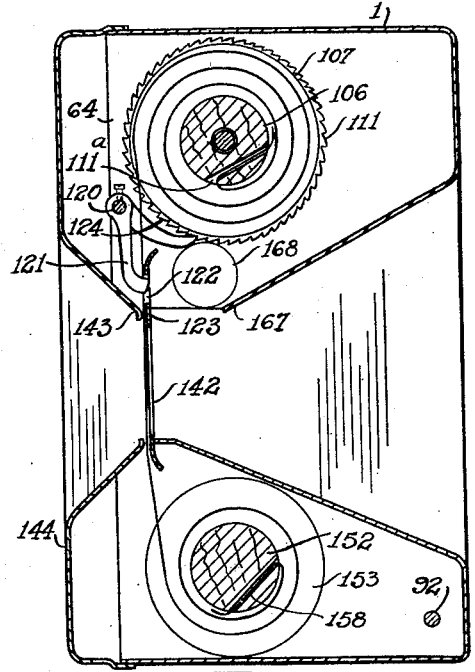
Figure 2:
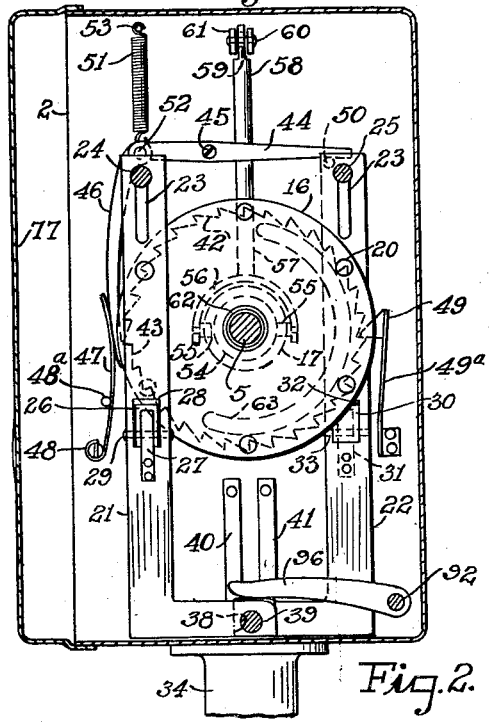
Figure 3:
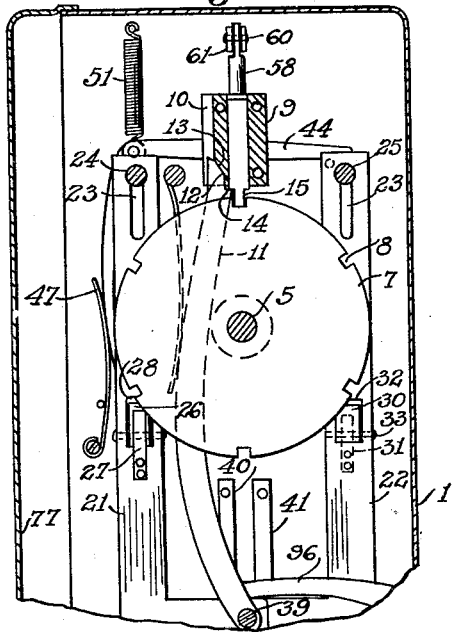

In the accompanying drawings illustrating my invention, Figure 1 is a front view of the device with the cover removed. Figure 2 is a sectional view of the device taken on the line 2—2 of Figure 1. Figure 3 is a sectional view of the same taken on the line 3—3 of Figure 1. Figure 4 is a sectional view of the device taken on the line 4—4 of Figure 1. Figure 5 is a sectional view thereof taken on the line 5—5 of Figure 1. Figure 6 is a detail view of one of the rollers. Figure 7 is a view of the complete device. Figure 8 is a view of a portion of the advertising strip. Figure 9 is a view of the street indicating strip. Figure 10 is a view of the top advertising roller drive means. And Figure 11 is a detail view of the top roller for the street indicating strip.

The advertising display indexing device will now be described.

Referring to Figure 1, there is secured in the end of an elongated U-shaped metal case 1 an end plate 2 attached at its periphery to the case by screws 3. Adjacent the plate 2 and likewise attached to the case 1 is another plate 4, similar to the plate 2.

Journalled in the plate 2 near its center is a shaft 5, whose opposite end is journalled in and extends through the plate 4, and has secured to the end thereof a gear 6. (See Figure 1).

Between the plates 2 and 4 and adjacent the plate 4 is a disc 7 pinned to the shaft 5 and having equally spaced about its periphery six slots 8. (See Figure 3).

Secured to the plate 4, above the disc 7, is a detent block 9 having a cam slot 10 in one side thereof to receive a pitman 11 having an inclined face 12 in engagement with the cam portion 13 of the cam slot 10.

Below its inclined face 12, the pitman 11 is formed with a shoulder 14 adapted to engage the lower end of a detent 15 to raise the latter out of engagement with one of the slots 8 in the disc 7. (See Figure 3).

Slidably mounted upon the shaft 5 adjacent the disc 7 is a cam plate 16 having a hub 17 formed with a keyway 18 to receive a Woodruff key 19. Equally spaced about the periphery of the cam disc 16 are six cam pins 20 that project from each side of the disc a like distance. On each side of the disc 16 and parallel with its faces are two oppositely disposed L-shaped cam bars 21—22 having in their upper ends elongated slots 23 to permit a reciprocating movement on studs 24—25. (See Figures 1 and 2).

The cam bar 21 is provided with a pawl 26 positioned adjacent the disc 16 so that when the detent 15 engages one of the slots 8 in the disc 7 one of the cam pins 20 will be slightly above the pawl 26. (See Figures 1, 2 and 3).

The pawl 26 is held in the extended position by a flat spring 27 riveted to the opposite side of the bar 21 and whose free end engages the pawl through an elongated hole 28 in said bar. The pawl 26 is pivoted on a pin 29 extending through the bar 21.

The cam bar 22 is likewise provided with an oppositely disposed pawl 30 also positioned adjacent the disc 16 so that when the detent 15 engages one of the slots 8 in the disc 7, one of the cam pins 20 will be slightly above the pawl 30. (See Figures 1, 2 and 3).

Like the pawl 26, the pawl 30 is held in an extended position by a flat spring 31 riveted to the opposite side of the cam bar 22 and engaging the pawl through an elongated hole 32 within which the pawl is pivoted on a pin 33.

Reciprocating motion is imparted to the cam bars 21 and 22 and the pitman 11 by a compressed air cylinder 34 mounted on the bottom of the case 1 and supplied with air through a pipe connection 35 and a two-way valve 36 from a source not shown. Air from the cylinder is discharged through the pipe 35, valve 36 and discharge line 37. (See Figure 7). This valve is conveniently located for operation by a motorman or driver through a handle 36ª, to permit compressed air to enter the cylinder 34 for the alternate reciprocation of the cam bars 21 and 22.

Extending from the top of the cylinder 34 into the case 1 and between the cam bars 21 and 22 is a piston rod 38 drilled to receive a cross head pin 39. The pin 39 passes through the lower or foot portion of the cam bars 21 and 22 and the lower end of the pitman 11 and terminates between pairs of guides 40—41, riveted on the plates 2 and 4 to prevent the rotation of the piston rod 38. (See Figures 1 and 2).

The direction of rotation imparted to the shaft 5 will depend upon which one of the pawls 26 and 30 is brought into engagement with the pins 20 by the following means. Freely mounted on the shaft adjacent the plate 2 is a ratchet gear 42 having equally spaced ratchet teeth 43 about its periphery. Above the ratchet gear 42 is a lever arm 44 pivoted on a stud 45 on the plate 2, and having fulcrumed to one end thereof a depending hooked ratchet pawl 46 adapted to engage the ratchet teeth 43 and held in engagement therewith by a flat spring 47 mounted on a stud 48 and held under tension by a pin 48ª in the plate 2. A detent 49 mounted on the spring 49ª secured to the plate 2 prevents reverse motion of the ratchet.

The end of the lever 44 opposite the pawl 46 extends over a pin 50 in the cam bar 21 so that when the cam bar is raised, the pawl 46 will drop down to engage a lower ratchet tooth. And when the cam bar 21 is lowered a tension spring 51, whose one end is secured to the pawl pivot stud 52 and whose opposite end is secured to a stud 53 in the plate 2, will return the ratchet to the position shown in Figure 2 and impart a partial revolution to the ratchet gear 42.

Cut into the hub 17 of the cam disc 16 is a groove 54 adapted to receive opposite studs 55, 55 on the yoke 56. Secured to the yoke 56 above the shaft 5 is a cam arm 57 whose upper end 58 is formed with an elongated hole 59 to receive a pin 60 extending through a bifurcated stud 61 on the plate 2. (See Figures 1 and 2.) Between the cam disc 16 and the hub of the disc 7 is a compression spring 62 to force the cam disc 16 towards the ratchet disc 42.

Mounted on the face of the ratchet disc 42 adjacent the cam arm 57 is a semi-circular cam 63. (See Figures 1 and 2.) Now when the piston and piston rod are reciprocated, motion will be imparted to the ratchet gear 42 through the means previously described and the cam 63 will be brought into engagement with the cam arm 57 to force the disc 16 into a position to be engaged by the pawl 46 until the cam 63 passes out of engagement with the arm 57 through the rotation of the ratchet disc 42 by the means previously described. When the cam 63 passes out of engagement with the arm 57, then the spring 62 will force the cam disc 16 toward the plate 2 until the pins 20 are in a position to be engaged by the pawl 30 to thus impart a reverse rotation to the disc 16 and gear 6. This reverse rotation continues until the ratchet disc 42 makes a one-half revolution and the cam 63 again forces the arm 57 and disc 16 toward the plate 4.

Above the gear 6 and between the plate 4 and an intermediate bearing plate 64 is a roller shaft 65 having fixedly secured thereto and in engagement with the gear 6 a pinion 66. (See Figure 1.) Mounted upon the shaft 65 is a roller 67 preferably of wood and having pressed upon each end a flanged disc 68—68 to retain advertising matter thereon. One end of the roller 67, adjacent the pinion 66, has a counterbore 69 to receive a helical spring 70 whose one end is pinned to the shaft 65 and whose outer end is secured to the end of the roller 67 to provide a flexible driving connection between the shaft 65 and the roller 67 to compensate for the varying diameter of the roll of advertising. (See Figure 10.)

Below the gear 6 and likewise journalled in the plates 4 and 64 is another shaft 71 having a pinion 72 meshing with the gear 6 and having securely mounted thereon another roller 73 having impressed upon each end a flanged disc 74—74 similar to the disc 68—68. (See Figure 1.)

Wound about the rollers 67 and 73 and to which the ends thereof are secured, is an elongated strip 75 of paper or similar medium upon which is printed advertising matter. The latter is adapted to pass before an opening 76 in a sectional cover 77 attached by hinges 78 to the top of the case 1 and provided with a latch 79 at the bottom of the case 1. Now, as the disc 16 is rotated through the means previously described, the various advertisements will be displayed in progression through the opening 76 as the strip is unwound from one roller and upon the other until the end thereof is reached. Then, through the action of the cam 63 and associated mechanism, the direction of the movement of the advertising will be reversed and the strip will be rewound upon the first roller to complete the cycle of operation.

The street directory mechanism will now be described. Secured in the case 1 at the end opposite the plate 2, by screws 80 is another plate 81. Pressed in the lower portion of the plate 81 is a sleeve 82 having a shoulder 83 and a reduced outer portion 84 upon which is freely mounted a gear 85 and held in place upon the shoulder 84 by a collar 86 pressed upon the latter after the gear is assembled. (See Figures 1, 5 and 6.)

Adjacent the gear 85 is an idler gear 87 mounted upon a stud 88 secured to the plate 81 and adapted to engage the lower end of a rack bar 89 held in mesh with the idler by a shouldered roller 90 pivoted on another stud 91 likewise mounted on the plate 81.

Extending lengthwise of the case 1 and journalled in the plates 4, 64 and 81 is a shaft 92 having secured upon its projecting end adjacent the plate 81 an arm 93 adapted to engage a roller 94 freely mounted on a stud 95 secured to the gear 85. (See Figures 1, 2, 4 and 5). The opposite end of the shaft 92 terminates at the cylinder 34 between the plates 2 and 4 and has attached thereto another arm 96 adapted to rest on the end of the piston rod 38. Now, when the piston rod is raised, motion will be imparted to the gear 85 through the shaft 92, arm 93 and roller 94. This partial rotation of the gear 85 will cause the rack to descend and as the piston descends the arm 93 will drop away from the roller 94 on the gear 85.

Above the gear 85, near the top of the plate 80, another bushing 97 having a shoulder 98 is pressed into the plate 80. The bushing 97 has a reduced outer portion 99 upon which there is freely mounted a gear quadrant 100 and held in place by a collar 100$^a$ pressed on the shoulder 98. (See Figure 11). The quadrant 100 has a depending lobe 101 to which there is freely pinned a pawl 102 having a weighted lower end 103, adapted to hold the pawl 102 in engagement with a ratchet wheel 104. The latter is securely mounted on a shaft 105 extending through the bushing 97 and journalled in the plate 64. (See Figures 1 and 5.)

Mounted on the shaft 105 between the plates 64 and 80 is a wooden roller 106 having flanged end discs 107—107$^a$ pressed into recesses 108—108 in the ends of the roller. The end disc 107$^a$ is provided with a key slot 109 at its center aperture to receive the ends of a pin 110 in the shaft 105 to impart rotation to the roller. (See Figure 11). Attached to the end disc 107 is a ratchet wheel 111 adapted to be engaged by a pawl to be hereinafter described.

Extending lengthwise of the roller 106 is an elongated saw slot 111$^a$ to receive the end of the printed strip to be hereinafter described. The outer end of the shaft 105 is provided with a hole 110$^b$ and oppositely disposed key slots 110$^c$ in its outer face to receive the rewind lever to be hereinafter described.

Adjacent the quadrant 100 is another idler gear 112 similar to the idler 87 and adapted to mesh with the quadrant and the upper end 112$^a$ of the rack bar 89, and likewise held in engagement therewith by a shouldered roller 112$^b$ on a stud 112$^c$ on the plate 81. (See Figure 5).

When the rack bar is lowered as previously described, the quadrant 100 and pawl 102 will move in a counterclockwise direction as viewed in Figure 5; and when the arm 93 drops away from the roller 94 the rack will ascend through the tension of a spring 113 whose lower end is attached to a stud 114 at the center of the rack bar and whose upper end is attached to a stud 115 secured to the plate 81. The ascent of the rack bar will cause the pawl 102 to engage the teeth of the ratchet wheel 104 to impart a partial revolution to the shaft 105.

Fulcrumed on a stud 116 between the gear 85 and quadrant 100 is an arm 117 having a bifurcated end 118 adapted to receive the spring stud 114 on the rack bar 89. The opposite end of the arm 117 has formed thereon a cam 118$^a$ fashioned to engage the lower end of a lever 119 when the rack bar 89 descends. The lever 119 is fixedly secured to the end of a shaft 120 journaled in the plate 81 and extending through the intermediate plate 64 adjacent their front edges near the quadrant 100.

Mounted upon the shaft 120 adjacent the plate 81 between the plates 64 and 81 is a finger 121 adapted to register with a hole 122 in a guide plate 123 extending between the plates 64 and 81. On the opposite end of the shaft 120 is a pawl 124 adapted to engage the ratchet wheel 111 carried by the top roll 106. (See Figures 1 and 4). Between the finger 121 and the plate 81 surrounding the shaft 120 is a tension spring 124$^a$ whose one end is secured to the finger 121 and whose opposite end is secured to the plate 81.

Between the lower end of the arm 117 and the shaft 120 there is formed on the lever an upturned lug 125 adapted to contact with the reduced end 126 of a latch bar 127. The latch bar 127 is slidably mounted on two screws 128—128 in the plate 81 and is provided a lateral movement through the elongated slots 129—129 in the bar. Formed on the top edge of the bar is an inclined cam surface 130 adapted to engage the lower cam face 131 of a release lever 132 fulcrumed on a stud 133 on the plate 80.

The top edge of the release lever is formed with an arcuate lip 134 to co-act with the weighted end 103 of the pawl 102 to raise the latter when the latch bar 127 moves outward with the lever 117 to release the pawl from engagement with the ratchet 104.

Formed in the end of the bar 127 opposite the reduced end 126 is a hole 135 registering with a hole 136 in the plate 81. The purpose of these registering holes is to receive the shaft 137 of a rewind lever 138 when the latter is not in use to retain the latch bar in a retracted position. The latch bar is actuated by a flat spring 139 whose lower end is secured to the plate 81 by a screw 140 and held in tension by a pin 141 in the plate 81.

Formed in the center of the guide plate 123 is an elongated opening 142 registering with an opening 143 in the sectional cover 144 before which passes an elongated strip 145 of paper or other suitable material, preferably transparent material, upon which is printed the successive names of stops made by the vehicle. The cover 144 like the cover 77 is secured at its top edge to the case 1 by hinges 146 and is provided with a latch 147 along its lower edge. Secured to the plate 64 between the plates 64 and 80 and in alignment with the sleeve 82 is a stud 148 having a conical end 149 terminating at a shoulder 150. (See Figure 6.)

The street stop medium 145 is wound upon a wooden roller 152 having flange end discs 153 and 154 pressed into a recess 155 and 156 in the ends of the roller and the end disc 154 has at its center aperture oppositely disposed slots 157, 157. The roller is provided with an elongated saw slot 158 into which one end of the strip 145 is inserted.

Freely mounted in the bushing 82 is a shouldered stud 159 having a conical end 160 terminating at a shoulder 161. Between the shoulder 161 and the plate 81 is a flat spring 162 apertured to receive the stud 159 and to force the latter into engagement with the roller 152 and hold the latter on the stud 149.

The outer end of the stud has pressed thereon a retaining collar 163 and at its inner end is provided with a pin 164 that is received by the slots 157 in the disc 154 for a driving connection. The outer end of the stud also has a recess 165 and oppositely disposed slots 165$^a$ to receive a pin 137$^a$ in the rewind lever 138.

The rear of the case 1 behind an elongated aperture 166 in the plate 123, and corresponding with the opening 143, has another opening 167 to provide a view by the vehicle operator of the indication displayed on the strip 145. Above the opening 167 there is provided an electric bulb 168 to illuminate the names displayed. Likewise, behind the opening 76 is another electric bulb 169 to illuminate the advertising 75.

The operation of the stop indicating means will now be described. A roller 152 carrying the correct list of stops, in succession, on the route covered by the vehicle, is inserted between the studs 149 and 159 in much the same manner as kodak film rolls are inserted. The outer end of the strip 145 is passed upwardly over the plate 123 to the slot 111$^a$ in the top roll 106.

As the rack bar 89 is reciprocated and motion imparted to the roller 106 through the means previously described, the paper will be withdrawn from the roll 152 and rewound upon the roller 106, by the pull exerted by the spring 113 on said rack bar.

To aline the stop indication with the opening 143, I have provided along one edge of the strip 145 and centered between the stop indications, rectangular openings 145$^a$ adapted to pass under the finger 121. When one of the openings 145$^a$ passes under the finger 121 and registers with the hole 122 in the plate 123, the finger will be forced inwardly by the spring 124$^a$ to bring the pawl 124 into engagement with a tooth on the ratchet wheel 111 secured to the top roller 106 to thus arrest any further movement thereof.

At the next operation, when the cylinder 34 is charged with compressed air, the lever 93 will be raised to rotate the gear 85 to cause the rack bar 89 to descend. Now, as the rack bar descends it will cause the lever 117 to be rotated about the stud 116 and cam out the lower end of the lever 119 and through the movement of the shaft 120 cause the pawl 124 to disengage the ratchet wheel 111, and remove the finger 121 from the opening 122.

The strip 145 is now free to be wound upon the roller 106 when the rack bar 89 ascends through the pull of the spring 113.

Upon reaching the end of the vehicle's route, the operator will remove the rewinding lever 138 from the holes 135—136 and insert the end 137 in the recess 165 with the pin 137$^a$ engaging the slot 165$^a$.

The latch bar 127 is moved forwardly by the spring 139 until the end 126 engages the lug 125 on the arm 149 and forces the latter forward. This movement of the arm 119 again raises the finger 121 out of the opening 145$^a$ in the strip 145 and releases the pawl 124 from engagement with the ratchet disc 111.

The forward movement of the latch bar 127 also serves to raise the release lever 132 into engagement with the weighted end 103 of the pawl 102 to release the engagement of the latter with the ratchet disc 104. The strip 145 is now free to be rewound upon the lower roller by the lever 138.

Having described my invention, I claim:

1. In a device of the type described, a casing, two pairs of rollers mounted therein, one pair being axially adjacent the other pair, an advertising strip adapted to be wound from one roller onto the other roller of one pair, a stop indicating strip adapted to be wound from one roller to the other roller of the other pair, a cylinder, a plunger in said cylinder, means connected between said plunger and the advertising strip rollers to actuate them when the plunger is raised, a spring for operating the stop strip rollers, and mean actuated by the plunger for tensioning said spring during the upward movement of the plunger, and for releasing it to rotate the stop strip rollers during the downward movement of the plunger.

2. In a device of the type described, a casing, two pairs of rollers mounted therein, one pair being axially adjacent the other pair, an advertising strip adapted to be wound from one roller onto the other roller of one pair, a stop indicating strip adapted to be wound from one roller to the other roller of the other pair, a cylinder, a plunger in said cylinder, cam and pin wheel means adapted to be actuated by the plunger on its upward movement to rotate the roller on which the advertising strip winds, rack and pinion means for rotating the roller upon which the stop indicating strip winds, a spring for operating the rack and pinion means to rotate the stop winding roller, and means for tensioning said spring upon the upward movement of said plunger and for releasing it to operate the rack and pinion means upon the downward movement of said plunger.

3. In a device of the type described, a casing, two pairs of rollers mounted therein, one pair being axially adjacent the other pair, an advertising strip adapted to be wound from one roller onto the other roller of one pair, a stop indicating strip adapted to be wound from one roller to the other roller of the other pair, a cylinder, a plunger in said cylinder, means operatively connected between said plunger and advertising strip winding roller to rotate it upon the upward movement of said plunger, rack and pinion means for rotating the stop strip winding roller, a spring adapted to be put under tension by the downward movement of said rack, to raise it, when released, to rotate the stop strip winding roller pinion, a gear, a pinion between the lower end of the rack and said gear, an axial projection on the face of the gear, and an arm operated by the upward movement of the plunger, to engage said projection and turn the gear to tension the spring, and adapted to descend below said projection upon the downward movement of the plunger for the purpose specified.

4. In a device of the type described, a casing, a pair of shafts mounted, one above the other, in said casing, a roller carried by each shaft, a strip adapted to be wound from one roller onto the other, alined openings formed in said strip adjacent one edge thereof, a third shaft parallel with the roller shafts, a finger secured to the third shaft for entrance into said openings when the strip is drawn past it, a pawl also secured to the third shaft, a spring adapted to engage the finger to force it into one of said openings, and a ratchet wheel secured to the top roller shaft for engagement by the pawl to arrest the rotation of said shaft when the finger is pressed through one of the openings in the strip, by the spring.

5. In a device of the type described, a casing, a pair of shafts mounted, one above the other, in said casing, a roller carried by each shaft, a strip adapted to be wound from one roller onto the other, alined openings formed in said strip adjacent one edge thereof, a third shaft parallel with the roller shafts, a finger secured to the third shaft for entrance into said openings when the strip is drawn past it, a vertically movable rack for rotating the top roller shaft, upon its upward movement, a pawl secured to the third shaft, a spring adapted to engage the finger to force it into one of said openings, a ratchet wheel secured to the top roller shaft for engagement by the pawl to arrest the rotation of said shaft when the finger is pressed through one of the openings in the strip, by the spring, and means operated by the downward movement of the rack to rotate the third shaft in a reverse direction to withdraw the finger from the opening which it has entered and the pawl from engagement with said ratchet.

6. In a device of the type described, a casing, a pair of shafts mounted, one above the other, in said casing, a roller carried by each shaft, a strip adapted to be wound from one roller onto the other, alined openings formed in said strip adjacent one edge thereof, a third shaft parallel with the roller shafts, a finger secured to the third shaft for entrance into said openings when the strip is drawn past it, a vertically movable rack for rotating the top roller shaft, upon its upward movement, a pawl secured to the third shaft, a spring adapted to engage the finger to force it into one of said openings, a ratchet wheel secured to the top roller shaft for engagement by the pawl to arrest the rotation of said shaft when the finger is pressed through one of the openings in the strip, by the spring, a lever, one end of which is secured to the rack, the free end of said lever formed with a cam face, and an arm secured to the third shaft for engagement at its free end by the free end of the lever when the rack descends, to withdraw the finger from the opening which it has entered and the pawl from engagement with the ratchet wheel.

7. In a device of the type described, a casing, a pair of shafts mounted, one above the other, in said casing a roller carried by each shaft, a strip adapted to be wound from one roller onto the other, alined openings formed in said strip adjacent one edge thereof, a third shaft parallel with the roller shafts, a finger secured to the third shaft for entrance into said openings when the strip is drawn past it, a vertically movable rack for rotating the top roller shaft, upon its upward movement, a pawl secured to the third shaft, a spring adapted to engage the finger to force it into one of said openings, a ratchet wheel secured to the top roller shaft for engagement by the pawl to arrest the rotation of said shaft when the finger is pressed through one of the openings in the strip, by the spring, a lever, one end of which is secured to the rack, the free end of said lever formed with a cam face, an arm secured to the third shaft for engagement at its free end by the free end of the lever when the rack descends, to withdraw the finger from the opening which it has entered and the pawl from engagement with the ratchet wheel, a slide adapted to engage said arm to hold it clear of the cam end of said lever, a rewind key for holding said slide out of engagement with said arm, and a spring for forcing said slide into engagement with said lever when the rewind key is withdrawn.

8. In a device of the type described, a casing, a pair of shafts mounted, one above the other, in said casing, a roller carried by each shaft, a strip adapted to be wound from one roller onto the other, a ratchet wheel on the top roller shaft, a gear quadrant, a pawl carried by the latter to engage the ratchet, means for turning said quadrant, a cam slide below said pawl, a rewind key for holding said slide in a fixed position, a hinged cam lever adapted to to be engaged by said slide when the latter is moved forward after the rewind key is removed, to engage the free end of the pawl to disengage it from the ratchet wheel, and a spring for moving said slide forward when the rewind key is removed.

9. In a device of the type described, a casing, a pair of shafts mounted, one above the other, in said casing, a roller carried by each shaft, a strip adapted to be wound from one roller onto the other, a pinion secured to each roller shaft, a gear in mesh with said pinions, a stub shaft to which the gear is secured, a cam disc slidably mounted on said stub shaft, axial projections on both sides of said disc and disposed circumferentially around it, a pair of vertically movable cam bars, one on each side of the stub shaft, cam means for shifting said cam disc on the stub shaft to bring the projections on one side of the disc into the path of upward movement of one of said cam bars, or to bring the projections on the other side of said disc into the path of upward movement of the other cam bar for the purpose specified.

10. In a device of the type described, a casing, a pair of shafts mounted, one above the other, in said casing, a roller carried by each shaft, a strip adapted to be wound from one roller onto the other, a pinion secured to each roller shaft, a gear in mesh with said pinions, a stub shaft to which the gear is secured, a cam disc slidably mounted on said stub shaft, axial projections on both sides of said disc and disposed circumferentially around it, a pair of vertically movable cam bars, one on each side of the stub shaft, and a semi-circular cam for shifting the cam disc on the stub shaft to bring the projections on one side of the disc into the path of upward movement of one of said cam bars, or to bring the projections on the other side of said disc into the path of upward movement of the other cam bar for the purpose specified.

11. In a device of the type described, a casing, a pair of shafts mounted, one above the other, in said casing, a roller carried by each shaft, a strip adapted to be wound from one roller onto the other, a pinion secured to each roller shaft, a gear in mesh with said pinions, a stub shaft to which the gear is secured, a cam disc slidably mounted on said stub shaft, axial projections on both sides of said disc and disposed circumferentially around it, a pair of vertically movable cam bars, one on each side of said stub shaft, for alternate engagement with said projections, a ratchet gear loosely mounted on said stub shaft, a semi-circular cam on one face of said ratchet gear, a pivotal arm connected at its free end to the cam disc for engagement by the semi-circular cam on the ratchet gear, and means for turning the ratchet gear to rotate the semi-circular cam a sufficient distance to shift the free end of the pivoted arm, and through it the cam disc, to bring the projections on one side of the cam disc into the path of upward movement of one of the cam bars.

12. In a device of the type described, a casing, a pair of shafts mounted, one above the other, in said casing, a roller carried by each shaft, a strip adapted to be wound from one roller onto the other, a pinion secured to each roller shaft, a gear in mesh with said pinions, a stub shaft to which the gear is secured, a cam disc slidably mounted on said stub shaft, axial projections on both sides of said disc and disposed circumferentially around it, a pair of vertically movable cam bars, one on each side of said stub shaft, for alternate engagement with said projections, a ratchet gear loosely mounted on said stub shaft, a semi-circular cam on one face of said ratchet gear, a pivoted arm connected at its free end to the cam disc, for engagement by the semi-circular cam on the ratchet gear to shift the cam disc on the stub shaft, a horizontal lever fulcrumed at its center, one end of said lever adapted to be engaged and raised by one cam bar, a pawl pivotally secured to the other end of said horizontal lever for engagement with the teeth of the ratchet gear, and a spring for raising the pawl to rotate the ratchet gear upon the downward movement of the last mentioned cam bar for the purpose specified.

13. In a device of the type described, a casing, a pair of shafts mounted, one above the other, in said casing, a roller carried by each shaft, a strip adapted to be wound from one roller onto the other, a pinion secured to one roller shaft, a gear in mesh with said pinion, a stub shaft to which said gear is secured, a pin wheel secured to the stub shaft, cam means for turning the pin wheel, a cylinder, a plunger in said cylinder to which said cam means are connected, a locking disc on the stub shaft provided with peripheral notches, a detent adapted to engage the locking disc, and a pitman arm pivotally secured at its lower end to the plunger, to withdraw the detent from the locking disc in advance of the engagement with the pin wheel, of the means for turning the latter.

14. In a device of the type described, a casing, a pair of shafts mounted, one above the other, in said casing, a roller carried by each shaft, a strip adapted to be wound from one roller onto the other, a pinion secured to one roller shaft, a gear in mesh with said pinion, a stub shaft to which said gear is secured, a pin wheel secured to the stub shaft, cam means for turning the pin wheel, a cylinder, a plunger in said cylinder to which the cam means are connected, a locking disc on the stub shaft provided with peripheral notches, a detent block having a cam slot, above said locking disc, a detent slidable in said block, and a pitman arm pivotally secured at its lower end to the plunger and formed at its upper end with a shoulder and a cam face, the shoulder to engage and lift the detent above one of the notches in said locking disc and the cam face to enter the slot in the detent block for the purpose specified, when the pitman arm is raised.

In testimony whereof I have hereunto set my hand this 20 day of September, 1930.

ANDREW R. LIVELY.